US008959486B2

(12) United States Patent
Bostick et al.

(10) Patent No.: US 8,959,486 B2
(45) Date of Patent: Feb. 17, 2015

(54) AUTOMATIC REGRESSION TESTING BASED ON CYCLOMATIC COMPLEXITY

(71) Applicant: International Business Machines Corporation, Armonk, NY (US)

(72) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/737,425

(22) Filed: Jan. 9, 2013

(65) Prior Publication Data

US 2014/0196011 A1    Jul. 10, 2014

(51) Int. Cl.
G06F 9/44       (2006.01)
G06F 11/00      (2006.01)
G06F 11/36      (2006.01)

(52) U.S. Cl.
CPC ................................ *G06F 11/3672* (2013.01)
USPC ........... 717/124; 717/125; 717/126; 717/130; 717/106; 714/32

(58) Field of Classification Search
None
See application file for complete search history.

(56) References Cited

U.S. PATENT DOCUMENTS

| 5,761,408 | A | | 6/1998 | Kolawa et al. |
| 5,778,169 | A | * | 7/1998 | Reinhardt .................... 714/38.1 |
| 6,189,116 | B1 | * | 2/2001 | Mongan et al. ............ 714/38.14 |
| 6,895,577 | B1 | * | 5/2005 | Noble et al. .................. 717/126 |
| 7,707,553 | B2 | | 4/2010 | Roques et al. |
| 7,975,257 | B2 | * | 7/2011 | Fanning et al. ............... 717/124 |
| 8,527,813 | B2 | * | 9/2013 | Budnik et al. .................. 714/32 |
| 8,561,021 | B2 | * | 10/2013 | Muharsky et al. ............ 717/113 |
| 8,694,966 | B2 | * | 4/2014 | Gupta .......................... 717/124 |
| 2009/0070738 | A1 | * | 3/2009 | Johnson ....................... 717/106 |
| 2011/0161936 | A1 | * | 6/2011 | Huang et al. ................. 717/130 |

FOREIGN PATENT DOCUMENTS

| EP | 2333669 B1 | 9/2012 |
| WO | 2007145745 A1 | 12/2007 |

OTHER PUBLICATIONS

Dustin, "About Buildbot", Sep. 19, 2011, p. 1, http://trac.buildbot.net/wiki/AboutBuildBot.
B. Smedburg et al., "Tinderbox", Aug. 21, 2012, pp. 1-3, https://developer.mozilla.org/en-US/docs/Tinderbox.

* cited by examiner

*Primary Examiner* — Don Wong
*Assistant Examiner* — Devayani R Talukdar
(74) *Attorney, Agent, or Firm* — John R. Pivnichny; Law Office of Jim Boice

(57) ABSTRACT

A processor-implemented method, system, and/or computer program product automates regression testing based on cyclomatic complexity of changed code. A base code change to a software program is identified as having a particular cyclomatic complexity. Multiple different software test routines are mapped to the base code change. A specific quantity of the different software test routines are then run to test the base code change, where the quantity of test routines that is run is based on the cyclomatic complexity of the base code change.

20 Claims, 3 Drawing Sheets

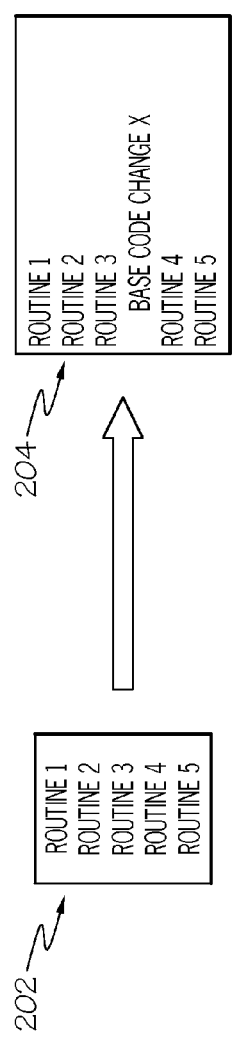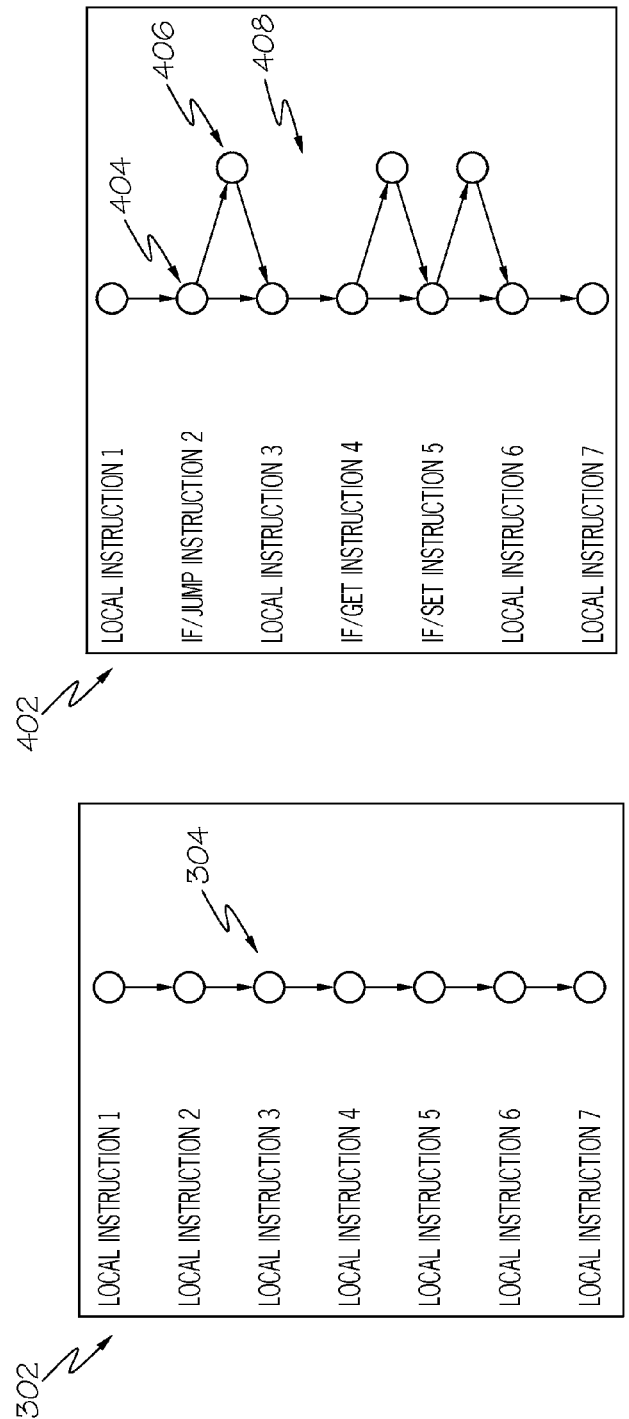

AUTOMATIC REGRESSION TESTING BASED ON CYCLOMATIC COMPLEXITY

BACKGROUND

The present disclosure relates to the field of computers, and specifically to the use of computers in testing software. Still more particularly, the present disclosure relates to automating regression testing of software that has been changed.

A common practice in software development is to test newly developed software for errors, also known as bugs. At times, fully developed and tested software, which runs without any errors, will be changed/upgraded. These changes/upgrades often cause new errors to occur. These new bugs/errors are known as "regressions". Thus, testing for errors that are caused by these changes is known as regression testing.

SUMMARY

A processor-implemented method, system, and/or computer program product automates regression testing based on cyclomatic complexity of changed code. A base code change to a software program is identified as having a particular cyclomatic complexity. Multiple different software test routines are mapped to the base code change. A specific quantity of the different software test routines are then run to test the base code change, where the quantity of test routines that is run is based on the cyclomatic complexity of the base code change.

BRIEF DESCRIPTION OF THE SEVERAL VIEWS OF THE DRAWINGS

FIG. 2 illustrates a high-level view of base code in a software program being altered by the addition of a base code change;

FIG. 3 depicts a base code change with minimal cyclomatic complexity;

FIG. 4 illustrated a base code change that has a higher level of cyclomatic complexity that the base code change shown in FIG. 3.

DETAILED DESCRIPTION

Figure 1:
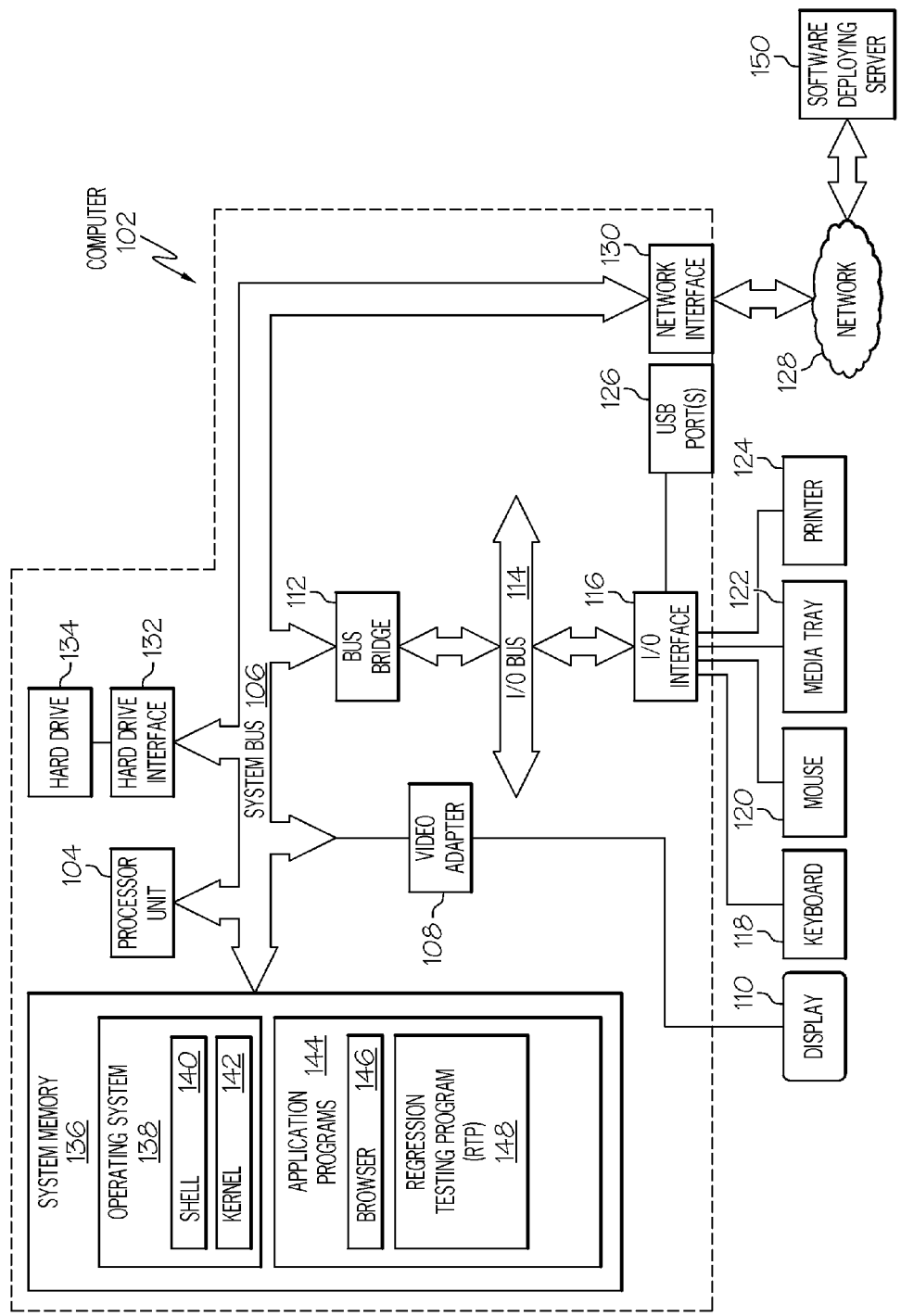
FIG. 1 depicts an exemplary computer system in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a regression testing program (RTP) 148. RTP 148 includes code for implementing the processes described below, including those described in FIGS. 2-5. In one embodiment, computer 102 is able to download RTP 148 from software deploying server 150, including in an on-demand basis, wherein the code in RTP 148 is not downloaded until needed for execution. Note further that, in one embodiment of the present invention, software deploying server 150 performs all of the functions associated with the present invention (including execution of RTP 148), thus freeing computer 102 from having to use its own internal computing resources to execute RTP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, a high-level view of base code in a software program being altered by the addition of a base code change is presented. As depicted, software program 202 is made up of base code, which is depicted for exemplary purposes as "Routine 1-Routine 5", where each routine is made up of one or more lines of software instruction. Note that while only 5 routines are depicted, it is understood that any number of routines can initially make up the software program 202. Software program 202, which may be an application program, an operating system, a HyperText Markup Language (HTML)-based program, or any other type of software, is altered/modified/upgraded by adding new code, which is depicted as "Base code change X", thus creating a modified software program 204. In the example shown, "Base code change X" is added while "Routine 1-Routine 5" are kept in the modified software program 204. Alternatively, the "Base code Change X" may replace one or more of the routines depicted as "Routine 1-Routine 5".

With reference now to FIG. 3, additional detail of the base code change ("Base code change X") shown in FIG. 2 is presented. In the example shown in FIG. 3, this example of the base code change 302 has minimal cyclomatic complexity, as graphically illustrated by linear graph 304. That is, the cyclomatic complexity of a software routine is defined by the formula:

$$M = E - N + P$$

where E=the number of edges of a graph of the software routine (depicted as arrows between two nodes, which are depicted as circles);

N=the number of nodes of the graph of the software routine; and

P=the number of connected components (exit nodes) depicted in the graph of the software routine.

Thus, in linear graph 304, the cyclomatic complexity of base code change 302 is:

$$M=6-7+1=0$$

where 6=the number of edges of a graph of the base code change; 7=the number of nodes of the graph of the base code change; and 1=the number of connected components (exit nodes) depicted in the graph of the base code change.

With reference now to FIG. 4, a base code change 402, which has a higher level of cyclomatic complexity that the base code change 302 shown in FIG. 3, is presented. Note that base code change 402 has several conditional instructions (e.g., If/Jump; If/Get; If/Set; etc.), which cause the base code changes 402 to go to different linearly independent paths. That is, the If/Jump instruction 2 causes a jump from the "If" instruction depicted as node 404 to another linearly independent path, depicted as node 406 in complex graph 408. Similar conditional movement is graphically shown with respect to If/Get Instruction 4 (in which a software object method/class is retrieved) and If/Set Instruction 5 (in which values are set for a software object).

Thus, utilizing the formula M=E−N+P, the cyclomatic complexity of base code change 402 is:

$$M=12-10+1=3$$

where 12=the number of edges of a graph of the base code change; 10=the number of nodes of the graph of the base code change; and 1=the number of connected components (exit nodes) depicted in the graph of the base code change. Therefore, base code change 402 has a greater cyclomatic complexity ("3") than base code change 302 ("0").

Figure 5:
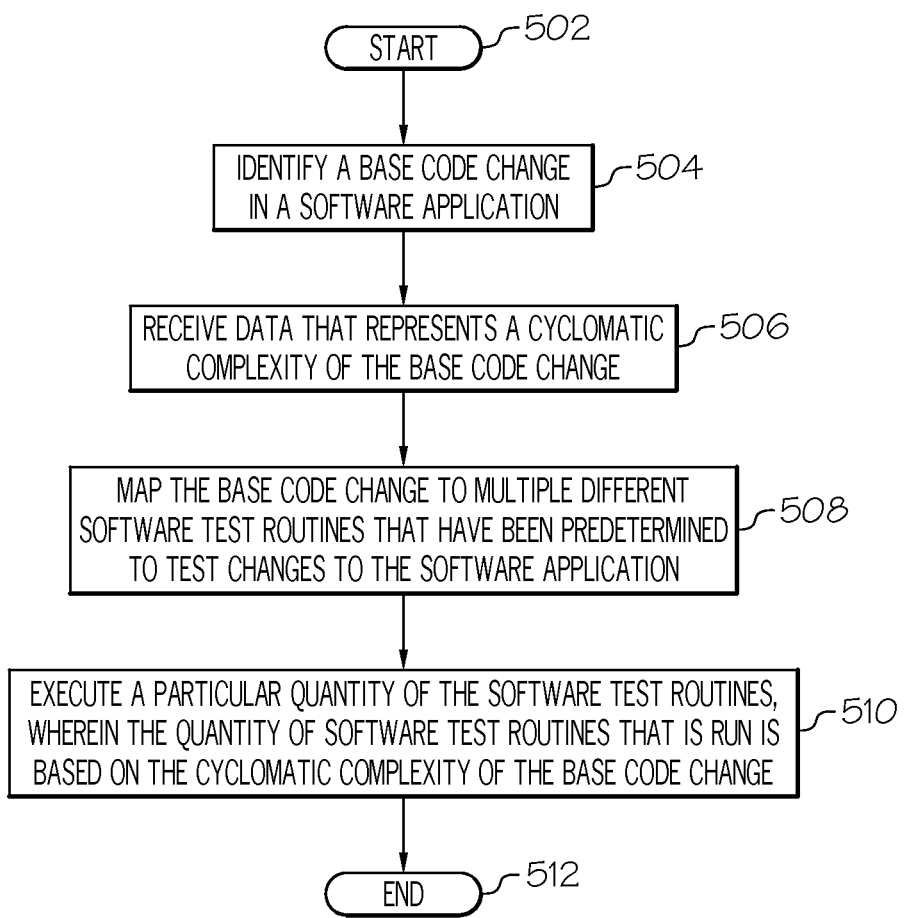
FIG. 5 is a high-level flow chart of one or more steps performed by a computer processor to automate regression testing software that has been modified by a base code change.

With reference now to FIG. 5, a high-level flow chart of one or more steps performed by a computer processor to automate regression testing of software that has been modified by a base code change is presented. After initiator block 502, a base code change in a software program is identified (block 504). As described herein, this base code change is an addition and/or modification to the software code in the original software program. As described in block 506, data that represents a cyclomatic complexity of the base code change is then received. In one embodiment, this cyclomatic complexity is based on the formula M=E−N+P, where E=the number of edges of a graph of the base code change; N=the number of nodes of the graph of the base code change; and P=the number of connected components (exit nodes) depicted in the graph of the base code change.

As described in block 508, the base code change is mapped to different software test routines that have been predetermined/predesignated to test changes to the software program. In one embodiment, these predetermined/predesignated software test routines are in a regression bucket, which is a collection of test routines that have been previously determined to be appropriate for running when a change has been made to the original software program. The predetermination/predesignation of these software test routines may be according to 1) prior test histories of the original software program; 2) manual selections of test routines made by a software test engineer; 3) heuristic selection processes; or 4) any other method selected by the user.

That is, in 1) the mapping to and predetermination/predesignation of which software test routines are to be run is made according to which software test routines have been run in the past. In one embodiment, the selection of which software test routines are run against the new base code change is made according to how effective particular software test routines have been in past regression tests.

In 2) the mapping to and predetermination/predesignation of which software test routines are to be run is simply made manually by a software test engineer, who may assign previously run software test routines to be run on the software program (e.g., after it has been modified), or the software test engineer may write a new program to test the software program, based on the changes (i.e., base code change) that have been made to the original software program.

In 3) the mapping to and predetermination/predesignation of which software test routines are to be run is based on an evolutionary process, in which software test routines that have been run on this and/or similar software programs are evaluated according to their effectiveness in identifying regression errors. Those software test routines that are effective (e.g., identify more than a predetermined percentage (e.g., 95%) of regression errors) are kept in the map/lookup table associated with this and/or similar software programs, while those that are deemed ineffective (e.g., identify less than the predetermined percentage (e.g., 95%) of regression errors) are removed from the map/lookup table associated with this and/or similar software programs.

Thus, a library of software test routines is created and stored for execution against this (or this type of) software application after it has been modified. As described in block 510, the quantity of software test routines from this library that is run is determined by the cyclomatic complexity of the base code change. For example, assume that there are 10 software test routines that have been predetermined/predesignated as being appropriate to run against a particular software application after that particular software application has been modified. However, running all 10 of these software test routines is expensive, both in time, money, and resources. Therefore, the cyclomatic complexity of the base code change determines how many of these 10 software test routines will actually be run. If there is little cyclomatic complexity in the base code change (e.g., as shown in the example in FIG. 3), then only 1-3 of the 10 software test routines may be run. However, there is a high cyclomatic complexity in the base code change (e.g., as shown in the example in FIG. 4), then 4-8 or more of the 10 software test routines may be run. The process ends at terminator block 512.

In one embodiment, the cyclomatic complexity of the base code change is not the only factor that determines how many of the predetermined/predesignated software test routines are run against the software program after it is modified. Other factors that determine how many of the predetermined/predesignated software test routines are run include the following:

In one embodiment, the number of lines of changed code that are found in the base code change determines how many of the predetermined/predesignated software test routines are run. For example, if only a few lines of code are changed, then only 1-3 software test routines are run. However, if hundreds or thousands of lines of code are changed/modified/added, then all of the software test routines that are associated with testing the software program after being modified may be run.

In one embodiment, the quantity of different software test routines that are executed on the base code change is based on whether the base code change has been predetermined to execute a new business requirement. That is, base code changes that execute the new business requirement are tested by more of the different software test routines than base code changes that do not execute the new business requirement. For example, assume that the base code change is designed to meet the requirements (e.g., a service level agreement or other contractual arrangement to provide certain services to a customer) of a new billing system. Thus, the base code change is deemed critical to meeting this new business requirement, and thus every reasonable step to ensure that the new billing system works properly needs to be taken. As such, a high number (e.g., 8-10 out of 10) of the predetermined/predesignated software test routines in the library for testing the software program (after it is modified) will be run. However, if the base code change is not related to a new business requirement (e.g., is merely maintenance of the original software program), then a relatively lower number (e.g., 1-3 out of 10) of the predetermined/predesignated software test routines in the library for testing the software program (after it is modified) will be run.

In one embodiment, the quantity of different software test routines that are executed on the base code change is based on a quantity of software routines that call the base code change. For example, assume that the base code change is an upgrade to an original software program. In one embodiment, these other software routines are part of the original software program that is modified by the base code change, while in another embodiment these other software routines are code found outside of the original software program that is modified by the base code change. In either embodiment, assume, for explanatory purposes, that several hundred other software routines will send program calls to (i.e., make invocations of) the base code change. As such, assurances need to be made that the base code change works properly, and thus a high number (e.g., 8-10 out of 10) of the predetermined/predesignated software test routines in the library for testing the software program (after it is modified) will be run. However, if the base code change will only be called by a few dozen or fewer other software routines, then a relatively lower number (e.g., 1-3 out of 10) of the predetermined/predesignated software test routines in the library for testing the software program (after it is modified) will be run.

In one embodiment, the quantity of different software test routines that are executed on the base code change is based on a quantity of downstream routines from the base code change, where base code changes that result in more downstream routines are tested by more of the different software test routines than base code changes that result in relatively fewer downstream routines. Assume again that the base code change is an upgrade to an original software program. These downstream routines are software routines in the original software program (which is being modified by the base code change) whose operations/inputs/etc. are affected, either directly or indirectly, by the base code change. For example, a downstream routine may use an output of the new base code change as an input to the downstream routine. If a high number (e.g., more than 10) of these downstream routines use the output of the new base code change, either directly (e.g., in the form of the output from the new base code change directly) or indirectly (e.g., after the output from the new base code has been operated upon by intermediate sections of the software program), then a high number (e.g., 8-10 out of 10) of the predetermined/predesignated software test routines in the library for testing the software program (after it is modified) will be run. However, if only a couple of downstream routines will use the output of the new base code change as an input (either directly or indirectly), then a relatively lower number (e.g., 1-3 out of 10) of the predetermined/predesignated software test routines in the library for testing the software program (after it is modified) will be run.

In one embodiment of the present invention, an alert indicating that a regression test is needed on the software program is issued in response to determining that the cyclomatic complexity of the base code change exceeds a predetermined value. For example, assume that the cyclomatic complexity of the base code change exceeds 5. In this scenario, an alert (e.g., an e-mail, a warning on a dashboard, etc.) is issued to an information technology (IT) professional, indicating that regression testing needs to be performed on the software program (which has been modified by the new base code change). However, if this number is not reached (i.e., the cyclomatic complexity is 4 or less), then no such warning is issued.

In one embodiment of the present invention, any software routines (either within or outside of the original software program that is modified by the base code change) that are called by the base code change are identified. These software routines that call on the base code change are tested. In one embodiment, this testing is automatically performed by a processor executing pre-identified test code on the software routines that are called by the base code change. Note that, in one embodiment, this pre-identified test code is not part of the library of test code that is used to test the base code change. Rather, this pre-identified test code is different test code that is customized to test the calling software routines, especially if these calling software routines are not part of the original software program that is modified by the base code change.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of automating regression testing, the processor-implemented method comprising:
    identifying, by a processor, a base code change in a software program;
    receiving, by the processor, a string of binary data that represents a cyclomatic complexity of the base code change, wherein the cyclomatic complexity of the base code change is defined by a formula: $M=E-N+P$
    where $E=$a quantity number of edges in a graph of the base code change,
    $N=$a quantity of nodes in the graph of the base code change, and
    $P=$a quantity of exit nodes depicted in the graph of the base code change;
    mapping, by the processor, the base code change to different software test routines, wherein the different software test routines have been predetermined to test changes to the software program; and
    executing, by the processor, a quantity of the different software test routines on the base code change to automatically perform regression testing on the software program, wherein the quantity of the different software test routines that are executed on the base code change is determined by the cyclomatic complexity of the base code change.

2. The processor-implemented method of claim 1, further comprising:
    the processor further determining the quantity of different software test routines that are executed on the base code change based on a number of lines of changed code found in the base code change.

3. The processor-implemented method of claim 1, further comprising:
    the processor further determining the quantity of different software test routines that are executed on the base code change based on whether the base code change has been predetermined to execute a new business requirement, wherein the new business requirement is from a contractual agreement to provide a new service to a customer, wherein base code changes that execute the new business requirement are tested by more of the different software test routines than base code changes that do not execute the new business requirement.

4. The processor-implemented method of claim 1, further comprising:
    the processor further determining the quantity of different software test routines that are executed on the base code change based on a quantity of software routines that call the base code change.

5. The processor-implemented method of claim 1, further comprising:
    the processor further determining the quantity of different software test routines that are executed on the base code change based on a quantity of downstream routines that utilize an output of the base code change, wherein a first base code change that causes an output that is used by more downstream routines than a second base code change is tested by more of the different software test routines than the second base code change whose output is used by relatively fewer downstream routines than the first base code change.

6. The processor-implemented method of claim 1, further comprising:
    the processor, in response to determining that the cyclomatic complexity of the base code change exceeds a predetermined value, issuing an alert indicating that a regression test is needed on the software program.

7. The processor-implemented method of claim 1, further comprising:
    the processor identifying any software routines that are called by the base code change; and
    the processor automatically executing pre-identified test code on the software routines that are called by the base code change.

8. A computer program product for automating regression testing, the computer program product comprising a computer readable storage medium having program code embodied therewith, the program code readable and executable by a processor to perform a method comprising:
    identifying, by a processor, a base code change in a software program;
    receiving, by the processor, a string of binary data that represents a cyclomatic complexity of the base code change, wherein the cyclomatic complexity of the base code change is defined by a formula: $M=E-N+P$
    where $E=$a quantity number of edges in a graph of the base code change,
    $N=$a quantity of nodes in the graph of the base code change, and
    $P=$a quantity of exit nodes depicted in the graph of the base code change;
    mapping, by the processor, the base code change to different software test routines, wherein the different software test routines have been predetermined to test changes to the software program; and
    executing, by the processor, a quantity of the different software test routines on the base code change to automatically perform regression testing on the software program, wherein the quantity of the different software test routines that are executed on the base code change is determined by the cyclomatic complexity of the base code change.

9. The computer program product of claim 8, further comprising program code that is readable and executable by the processor to:
    further determine the quantity of different software test routines that are executed on the base code change based on a number of lines of changed code found in the base code change.

10. The computer program product of claim 8, further comprising program code that is readable and executable by the processor to:

further determine the quantity of different software test routines that are executed on the base code change based on whether the base code change has been predetermined to execute a new business requirement, wherein base code changes that execute the new business requirement are tested by more of the different software test routines than base code changes that do not execute the new business requirement.

11. The computer program product of claim 8, further comprising program code that is readable and executable by the processor to:

further determine the quantity of different software test routines that are executed on the base code change based on a quantity of software routines that call the base code change.

12. The computer program product of claim 8, further comprising program code that is readable and executable by the processor to:

further determine the quantity of different software test routines that are executed on the base code change based on a quantity of downstream routines from the base code change, wherein base code changes that result in more downstream routines are tested by more of the different software test routines than base code changes that result in relatively fewer downstream routines.

13. The computer program product of claim 8, further comprising program code that is readable and executable by the processor to:

in response to determining that the cyclomatic complexity of the base code change exceeds a predetermined value, issue an alert indicating that a regression test is needed on the software program.

14. The computer program product of claim 8, further comprising program code that is readable and executable by the processor to:

identify any software routines that are called by the base code change; and automatically execute pre-identified test code on the software routines that are called by the base code change.

15. A computer system comprising:

a processor, a computer readable memory, and a non-transitory computer readable storage medium;

first program instructions to identify a base code change in a software program;

second program instructions to receive a string of binary data that represents a cyclomatic complexity of the base code change, wherein the cyclomatic complexity of the base code change is defined by a formula: $M=E-N+P$ where $E=$a quantity number of edges in a graph of the base code change, $N=$a quantity of nodes in the graph of the base code change, and $P=$a quantity of exit nodes depicted in the graph of the base code change;

third program instructions to map the base code change to different software test routines, wherein the different software test routines have been predetermined to test changes to the software program; and fourth program instructions to execute a quantity of the different software test routines on the base code change to automatically perform regression testing on the software program, wherein the quantity of the different software test routines that are executed on the base code change is determined by the cyclomatic complexity of the base code change; and wherein the first, second, third, and fourth program instructions are stored on the non-transitory computer readable storage medium for execution by the processor via the computer readable memory.

16. The computer system of claim 15, further comprising:

fifth program instructions to further determine the quantity of different software test routines that are executed on the base code change based on a number of lines of changed code found in the base code change;

and wherein the fifth program instructions are stored on the non-transitory computer readable storage medium for execution by the processor via the computer readable memory.

17. The computer system of claim 15, further comprising:

fifth program instructions to further determine the quantity of different software test routines that are executed on the base code change based on whether the base code change has been predetermined to execute a new business requirement, wherein base code changes that execute the new business requirement are tested by more of the different software test routines than base code changes that do not execute the new business requirement;

and wherein the fifth program instructions are stored on the non-transitory computer readable storage medium for execution by the processor via the computer readable memory.

18. The processor-implemented method of claim 1, further comprising:

displaying, by the processor, the graph of the base code change on a display.

19. The processor-implemented method of claim 1, wherein the base code change adds new code to the software program.

20. The processor-implemented method of claim 1, wherein the base code change alters existing code from the software program.

* * * * *